United States Patent
Walia (10) Patent No.: US 6,931,539 B2
(45) Date of Patent: Aug. 16, 2005

(54) METHODS AND SYSTEM FOR IMPROVED SEARCHING OF BIOMETRIC DATA

(75) Inventor: Guri Walia, 2010 Vallejo St., #5, San Francisco, CA (US) 94123

(73) Assignee: Guri Walia, San Mateo, CA (US)

( * ) Notice: Subject to any disclaimer, the term of this patent is extended or adjusted under 35 U.S.C. 154(b) by 0 days.

(21) Appl. No.: 10/891,445

(22) Filed: Jun. 23, 2004

(65) Prior Publication Data

US 2005/0039053 A1 Feb. 17, 2005

Related U.S. Application Data (60) Provisional application No. 60/480,957, filed on Jun. 23, 2003, and provisional application No. 60/480,958, filed on Jun. 23, 2003.

(51) Int. Cl.[7] .............................................. G06F 1/24
(52) U.S. Cl. ...................... 713/186; 713/182; 713/189; 713/193; 713/200; 713/201
(58) Field of Search ................................ 713/186, 182, 713/189, 193, 200, 201

(56) References Cited

U.S. PATENT DOCUMENTS

| | | | | |
|---|---|---|---|---|
| 3,928,719 A | * | 12/1975 | Sasabe et al. | 348/110 |
| 3,967,241 A | * | 6/1976 | Kawa | 382/227 |
| 3,993,976 A | * | 11/1976 | Ginsburg | 382/211 |

* cited by examiner

*Primary Examiner*—Thomas R. Peeso
(74) *Attorney, Agent, or Firm*—Sonny Gill (57) ABSTRACT

Systems and methods for improving the speed of authenticating a user are provided, which employ intelligent caching of biometric information and secondary information based upon learned user patterns. Also, in a biometric authentication system, biometric data of users is processed according to a plurality of device-dependent processes and stored in a repository. When performing an authentication, the biometric authentication system determines a capture device type and uses that determination to select among the plurality of device-dependent versions of biometric data. The device-dependent processes might be specific to particular manufacturers, device classes or other partitioning scheme.

13 Claims, 9 Drawing Sheets

METHODS AND SYSTEM FOR IMPROVED SEARCHING OF BIOMETRIC DATA

CLAIM FOR PRIORITY

This application claims priority to Provisional Application No. 60/480,957, filed Jun. 23, 2003, and to Provisional Application No. 60/480,958, filed Jun. 23, 2003.

BACKGROUND OF THE INVENTION

Biometric capture devices (fingerprint scanners, cameras, etc.) are used to authenticate people. In some cases, authentication is verification, i.e., wherein a person specifies who they are and the devices are used to verify that a person presented is indeed that person by comparing the presented person's biometric data to biometric data stored for the person specified. In other cases authentication is identification, wherein biometrics of a presented person are tested against a body or database of biometric data for many people to find a match, thereby identifying the presented person as the matching person. This can be done if, for example, the body of biometric data associates sets of biometric data with personal identifiers (name, ID number, alias or the like). For example, a presented person might present a fingerprint, which is then compared to each fingerprint in the body of biometric data to find a match. If a match is found, the presented person can be presumed to have the personal identifier (name, ID number, alias, or the like) associated with the matching fingerprint in the body of biometric data.

Biometric data, not by way of limitation, might include fingerprints, facial features, face images, voice, voice prints, iris scans, retina scans, body signals, signatures, blood typing, DNA scans, protein assays and the like. One or more of these might be used. Authentication can be done for any purpose, such as security, tracking, crime prevention, customization of other systems to user preferences, communication and other purposes.

The problem of identification in a biometric authentication or identification system can be difficult. For example, where identification is used to identify employees of a large organization when entering a building or other secured area, a biometric identification system must operate quickly to capture biometric data from a presented person and attempt a match of that presented person's biometric data against a possibly large set of biometric data of all the employees of the large organization. Identification must be done quickly, because the typical entry point would otherwise become a bottleneck for traffic. Identification is further complicated by the realities of biometric data not being amenable to being captured exactly in the same manner each time.

SUMMARY OF THE INVENTION

In a biometric authentication or identification system according to embodiments of the present invention, matches are performed efficiently, with high availability and fault-tolerance.

In one aspect, the present invention provides a method of authenticating the identity of a user based on biometric information of the user. A user interface is provided, the user interface configured to repeatedly receive authentication requests from a plurality of requesting users. Each authentication request contains biometric information of a requesting user. A pattern of repeated receptions by the user interface of authentication requests from a first user is learned. Based on the learned pattern, time periods of heightened probability of the user interface receiving an authentication request from the first user are determined. A biometric information file associated with the first user is obtained from a repository of users' biometric information files. The biometric information file associated with the first user is stored in a storage associated with the user interface during the determined time periods.

In another aspect, the present invention provides a system comprising a repository of multiple users' biometric information files, a user interface configured to receive a user's biometric information, a storage associated with the user interface, a matching software module, and one or more additional software modules. Each file in the repository contains biometric information of a user. The matching software module is configured to compare a user's biometric information received by the user interface with the biometric information files in the repository to find a biometric information file that substantially matches the received biometric information. The one or more software modules are configured to (1) learn a pattern associated with repeated reception's of a first user's biometric information by the user interface, (2) based on the learned pattern, determine time periods of heightened probability that the user interface will receive the first user's biometric information, (3) obtain a biometric information file associated with the first user from the repository, and (4) store the biometric information file associated with the first user in the storage during said determined time periods.

In a biometric authentication system according to embodiments of the present invention, biometric data of users is processed according to a plurality of device-dependent processes and stored in a repository. When performing an authentication, the biometric authentication system determines a capture device type and uses that determination to select among the plurality of device-dependent versions of biometric data. The device-dependent processes might be specific to particular manufacturers, device classes or other partitioning scheme.

In one aspect, the present invention provides a system for authenticating the identity of a user based on biometric information of the user, comprising a repository of multiple users' biometric information files, a user interface, and a software module. The user interface is configured to receive a plurality of different types of biometric information of a user. Each of the different types of biometric information is characterized as being obtained from a user by a different one of a plurality of different types of biometric capture devices. The software module is configured to execute in parallel a plurality of different algorithms for comparing biometric information received by the user interface to the biometric information files in the repository to find a biometric information file that substantially matches the received biometric information. Each of the algorithms is associated with a different one of the capture devices.

In yet another aspect, the present invention provides a method of authenticating the identity of a user based on biometric information of the user. A user's biometric information is received. A plurality of different algorithms for comparing the received biometric information to a plurality of biometric information files in a repository are executed in parallel to find a biometric information file that substantially matches the received biometric information.

In one particular embodiment of the aforedescribed method, receiving the user's biometric information comprises receiving one of a plurality of different types of biometric information. Each of the different types of biometric information is characterized as being obtained by a different one of a plurality of different types of biometric capture devices. Each of the algorithms is associated with a different one of the capture devices.

In yet another aspect, the present invention provides a biometric authentication system comprising a repository of biometric data of users processed according to a plurality of device-dependent processes, a means for determining an input-specific process, and a means for comparing biometric data of a presented person using a determined input-specific process and a record in the repository having biometric data captured using the determined input-specific process.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

DETAILED DESCRIPTION OF THE PREFERRED EMBODIMENTS

Database Caching

For a biometric system to provide high availability, performance and fault tolerance, the following characteristics of its design are preferred:
1. Parallel components
2. Secured data communication
3. Fault monitoring and recovery In the biometric system, a database of biometric data for a plurality of registered persons is maintained. For identification of a presented person, biometric data is obtained from the presented person and then compared to biometric data of registered persons. If a match is found, the system assumes that the presented person is the person registered in association with the matching biometric data from the repository.

The biometric data of a presented person can be cached by individual components referred to herein as "search engines". The search engines are managed by a Search Sub System (SSS) component, which takes care of request handling and fault monitoring, ensuring high availability and fault tolerance to the end user.

The search engines run in parallel to complete a request from the SSS. The number of instances of search engines might be based on the number of records (in the database) to be processed. For stable performance, more search engines might be used as the number of records increases.

Figure 1:
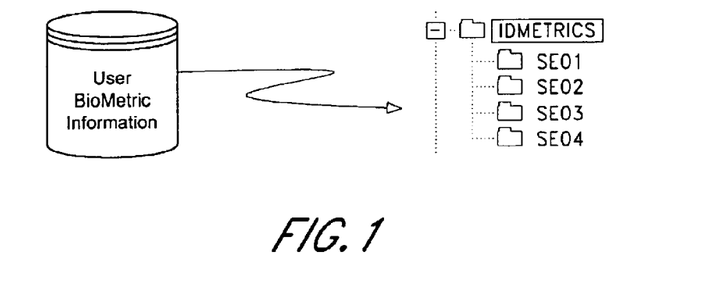
FIG. 1 illustrates a manner of distributing biometric information within search engines.

FIG. 1 shows how biometric data might be cached into flat files according to the number of search engines ("SEs") present in the system. If there are N engines configured, then the database records might be equally distributed over those N engines.

Figure 2:
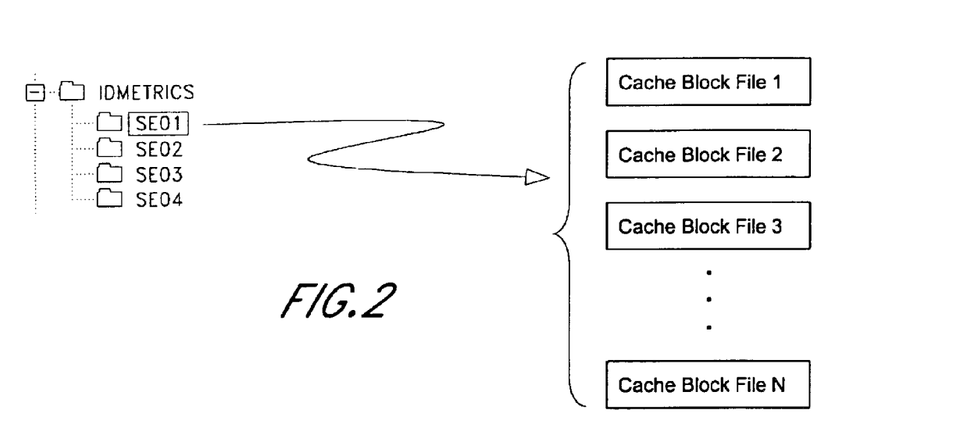
FIG. 2 illustrates a manner of distributing biometric information within cache blocks of each search engine.

Each SE has its own defined number of blocks of cached data, which can be handled in parallel (i.e., Cache Block File 'x'=Number of Records per SE/Number of Blocks per SE), as illustrated in FIG. 2.

Figure 3:
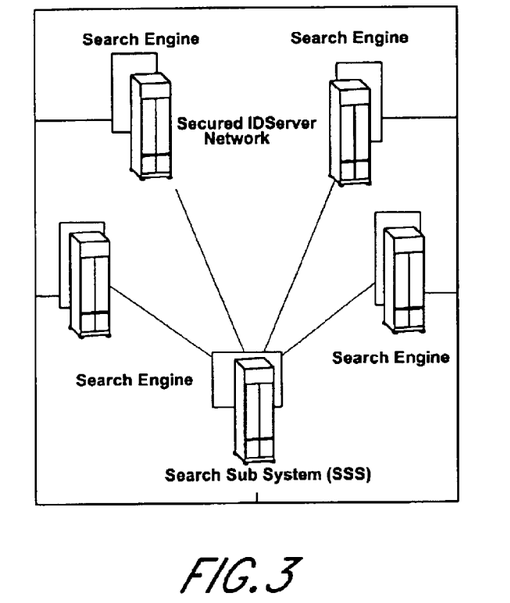
FIG. 3 illustrates a system architecture.

FIG. 3 illustrates interconnections between the SSS and SEs in one embodiment. The SEs are monitored by the SSS to ensure availability and fault recovery. SEs can be well connected with the SSS, thus ensuring reliability and performance.

The SSS and SEs can be connected in a local area network and communicate with each other through the TCP/IP protocol or other protocol. The SSS is connected to the database to cache the biometric data for SEs. The SSS is configured to prepare cache data as the number of file blocks for each SE and make them available in a shared directory server, which might be accessible only by SEs and the SSS.

The database caching mechanism improves system uptime and performance. Since these cache blocks are small enough and handled by different threads in each SE, the uptime is high and response is quick. These cache blocks are loaded in memory by the respective SEs. Hereafter, every identification request can be simply forwarded to all SEs and the SSS does very little parsing and processing on the data that is passing through.

A role played by an SE and the search technique ensures the overall system performance. A fault monitoring process of the SSS provides high availability.

Cache Management in SE

Figure 4:
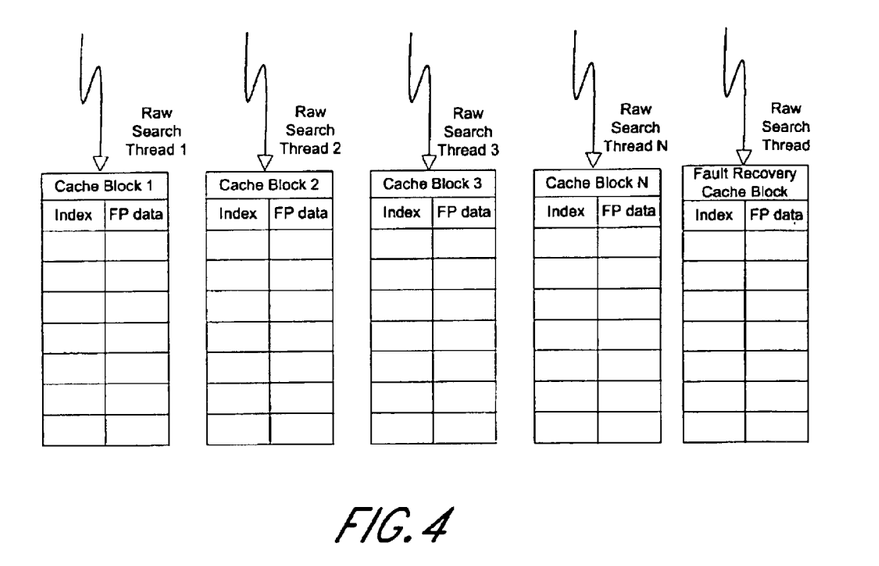
FIG. 4 illustrates cache block management in a search engine.

A SE loads different cache blocks into memory from the shared directory, which is accessible preferably only by the SSS and SEs. However, these cache blocks are managed by independent threads and usually for every identification request received from the SSS, a raw search is executed on these blocks by the respective search threads. FIG. 4 illustrates cache block management in an SE.

Performance

Although the performance of the biometric system depends on the capability of the algorithms to some level, the caching and search techniques used help speed the matching process.

In the search techniques used here, the pattern type of the biometric (right whorl, left whorl for fingerprint biometric, for example) is used as one of the bases for cache blocks and maintaining a history of identification events for the presented person or registered person (user). Other factors include PC information or ATM information, such as:

The IP Address of the PC used to register/modify or identify the user last time.

The Mac Address of the PC used to register/modify or identify the user last time.

The Windows Login User name of the PC used to register/modify or identify the user last time.

Default finger type chosen for matching (e.g. right thumb) in a system where multiple fingers are registered.

Other factors such as name, sex, age can also expedite the search if they are entered into the system.

These techniques have some dependency on the probability of repeated access to the biometric system from same PC or same network or in a periodic basis. For an analysis, consider the probabilities shown in FIG. 5 of a user accessing the system in selected categories.

Figure 5:
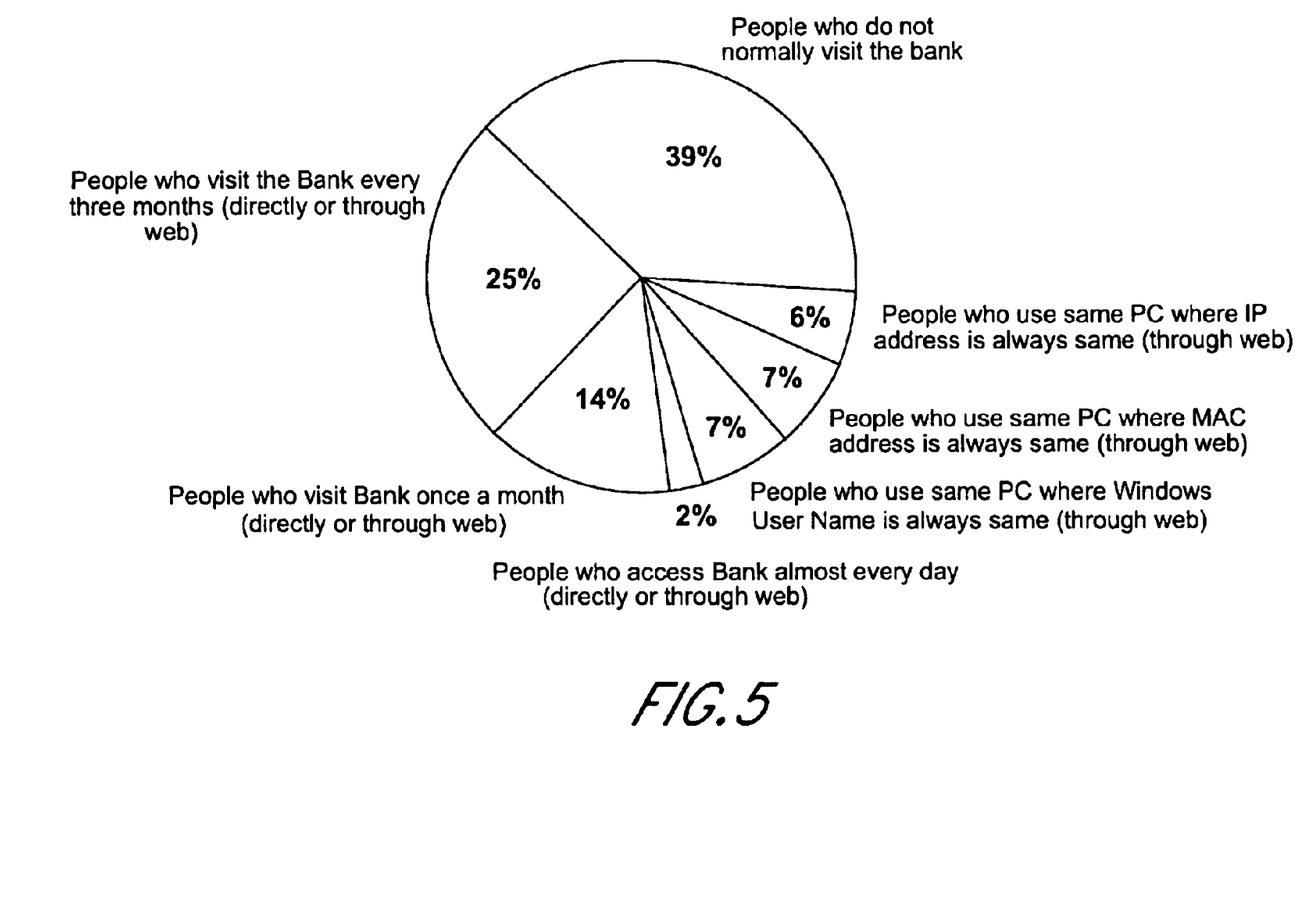
FIG. 5 illustrates different types of users' banking schedules, as an example of how to implement time-based caching.

As illustrated in FIG. 5, 39% of the time, the user does not usually visit the bank either physically or online. There are only two major classifications: people who visit the bank at regular intervals and people who do transactions online.

Caching by Time of Access

Based on the above classification, considering people who visit the bank at regular intervals, there could be three subclassifications:

People who visit the bank more than once in a day

People who visit the bank once every month

People who visit the bank every three months

So, keeping a note on the people visiting the bank at regular intervals will speed up the identification process. The identification system identifies him/her in seconds if he/she falls in any of the above categories.

Figure 6:
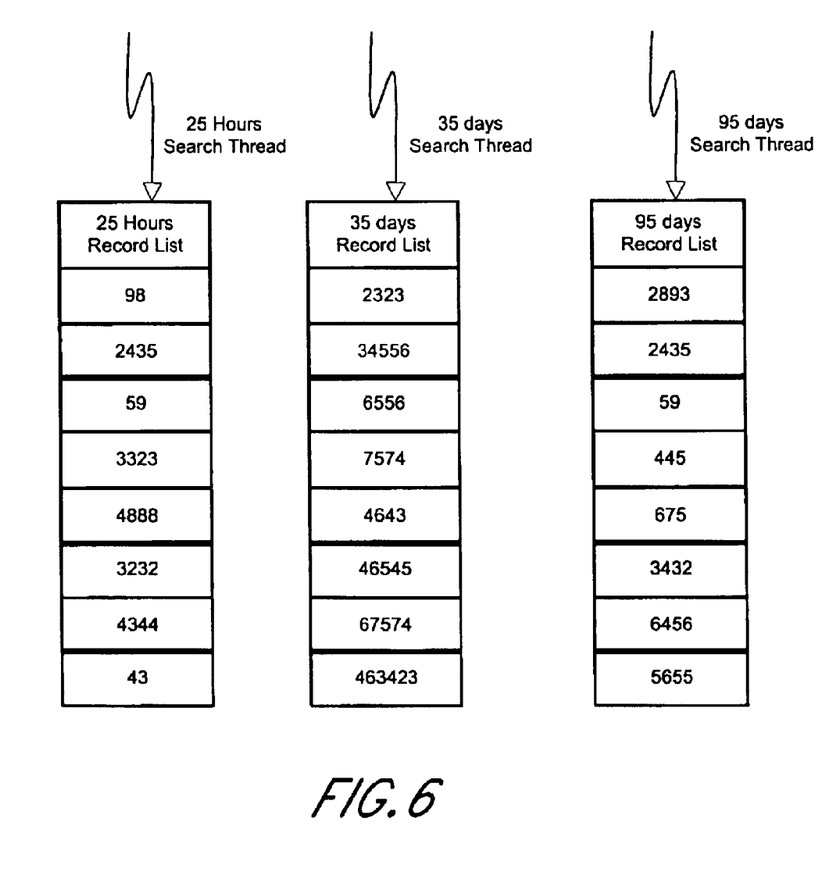
FIG. 6 illustrates a method of hashing references to user biometric information.

FIG. 6 illustrates the way record offsets (or references to user biometric information in the cache block) are hashed to do a sequential search only on these records on a priority basis. The numbers specified in the hash entries are references to the biometric information of the user that visits the bank at regular intervals. The figure illustrates time based caching, wherein reference to users visiting the bank at periodic intervals is hashed and maintained by different threads. Each hash table can hold up to 'N' defined entries. The numbers in the illustrated lists show the record offset in the cache block of the user who accesses the identification/ system in every 25 hours/35 days/95 days respectively.

Caching by PC Identifier of PC Used for Access

Considering people who visit or do bank transactions through the web, the system keeps a note of the PC used to do the transaction. Whenever biometric identification is requested from a PC, the computer's IP Address (if DHCP is not enabled), Windows™ user-name and MAC address might be captured and stored as references to the particular user.

The notes/references are stored in different hash tables along with the respective user ID to identify the user quickly in subsequent identification requests.

Caching by Device Used for Access

Figure 7:
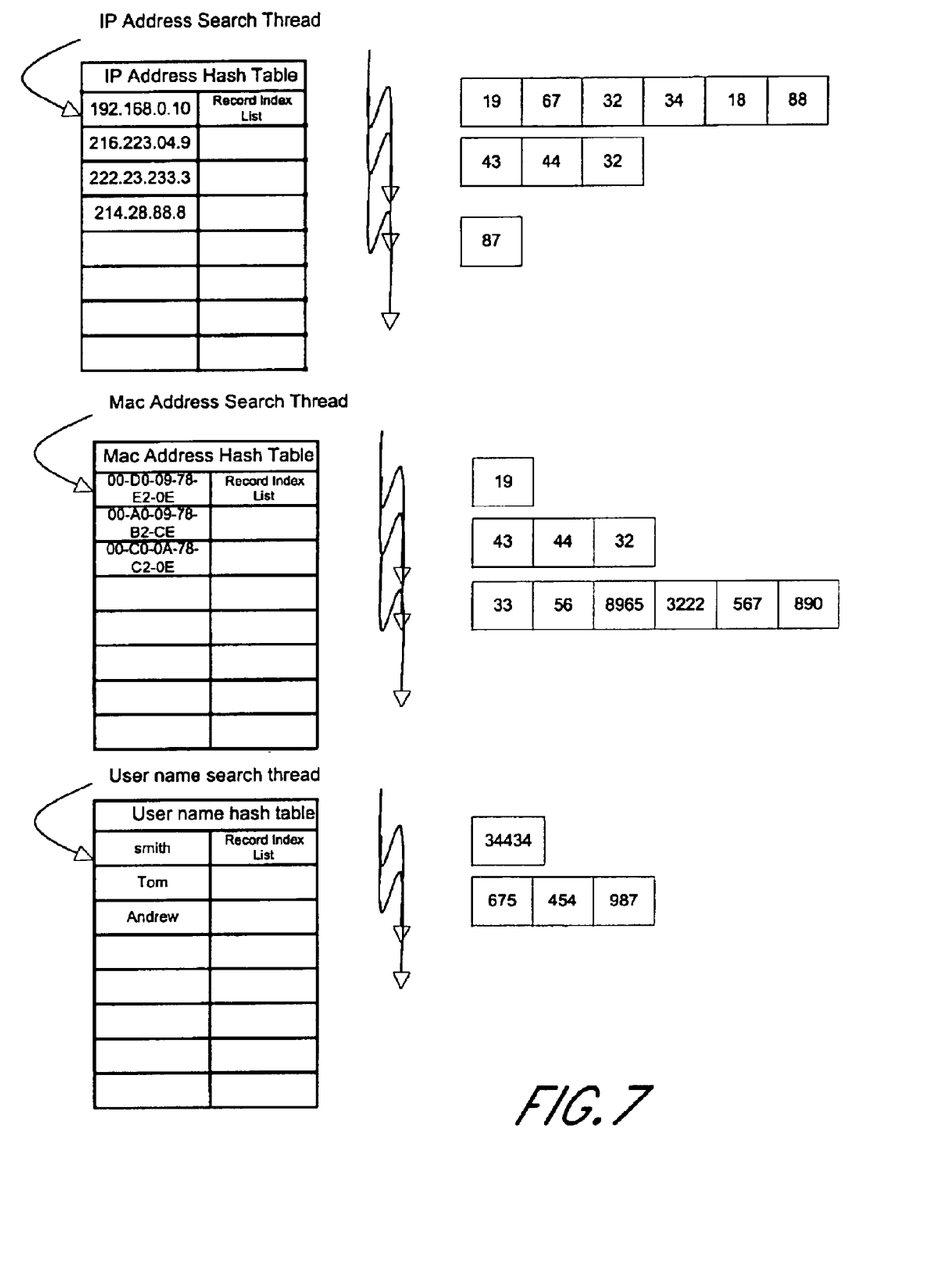
FIG. 7 illustrates an alternative hashing technique.

FIG. 7 illustrates another hashing technique that might be used. The hash tables shown in FIG. 7 are maintained by individual threads in order to quickly identify the user. The figure illustrates PC information based caching, wherein references to users who do many repeated transactions through the Web from a personal or shared PC or ATM are hashed and maintained by different threads. The numbers on the right of the IP Address Hash Table show the record offset in the cache block that were registered/modified/verified from the PC for which the IP address is on the left side of the table. The numbers on the right side of the Mac Address Hash Table show the record offset in the cache block that were registered/modified/verified from the PC for which the MAC address is on the left side of the table. The numbers on the right side of the User name hash table show the record offset in the cache block that were registered/modified/ verified from the PC for which the operating system user name is on the left side of the table.

The PC information based cache might track the personal computer used by the user, but it can also track information about an ATM where the user would like to access his/her account or does transactions repeatedly. Caching information of users repeatedly accessing a particular ATM could help identify the user faster.

An Example Case

Assume a database of 100,000 biometric data records and four SEs and a Search Sub System. Suppose further that each of the four SEs are configured to have five blocks of cache data. The records can be allocated unevenly or evenly among the SEs with four SEs and five blocks each evenly dividing the records into 5,000 records per cache block.

The records in each cache block are made available by the SSS. Respective hash threads in the SE generate "pre-select" information for each user, where available (e.g., IP address, MAC address, operating system user name for the computer used to register/modify the user biometric information, etc.)

All cache blocks are read into memory by individual cache block threads in each SE. Whenever an identification request is received from ID Exchange, the SSS parses and formats the request and sends it to all available SEs and waits for their response.

Once a SE receives an identification request, a search manager thread is launched that checks for any pre-select information, if available, in the identification request. If pre-select information is available, respective pre-select search threads are launched in parallel to search among matching entries. For example, if the search request contains an IP address, then an IP address pre-select thread is launched to check whether the IP address hash table contains the similar IP Address. Otherwise, these pre-select threads try to process the next request without necessarily waiting for a previous one to complete.

Figure 8:
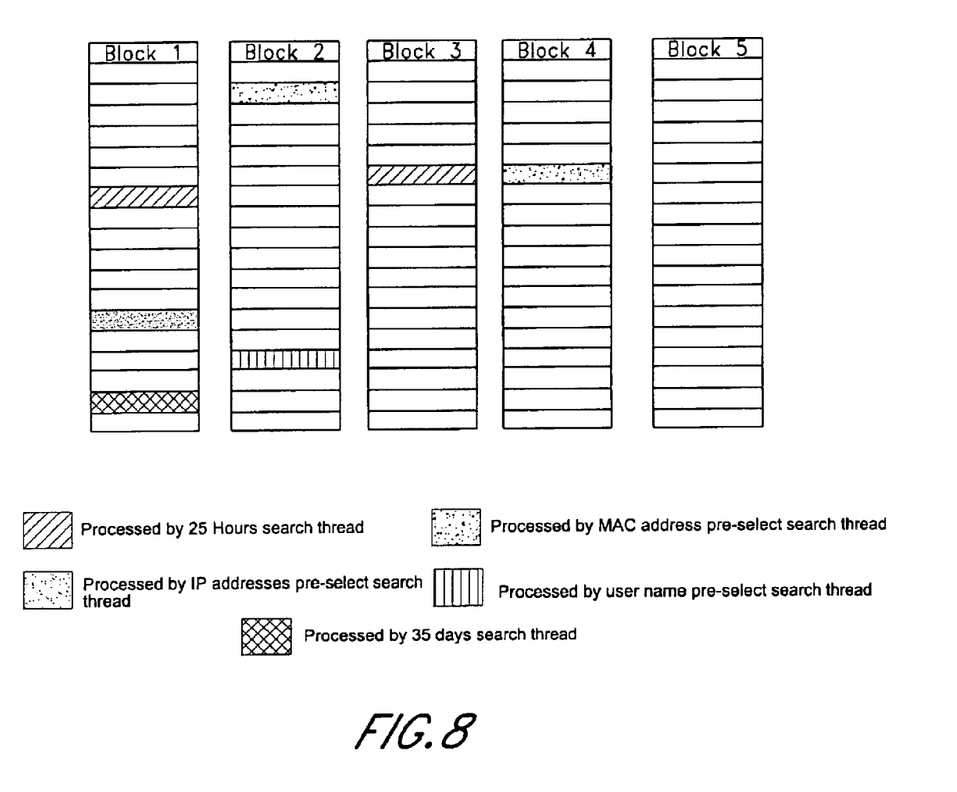
FIG. 8 illustrates a process queue of searched records generated by an authentication request from a new user.

The pre-select search threads do the following. If any of the pre-select information matches available entries in a hash table, the pre-select search thread tries to match the search data against those records available in a cache block. If a match is found, the respective pre-select thread reports the match to the search manager thread. Once a match is found, the search manager thread can terminate all other pre-select search threads. If there are no similar entries available in a hash table or if no match is found among the records that are processed by pre-select threads, then the searched records are added to a "processed queue". When a new user tries to identify himself/herself for the first time, and the pre-select information does not match any existing hash entries, then the processed queue would look similar to the diagram of FIG. 8.

Once all the pre-select threads are done, a raw search thread is executed per block to execute biometric matching from top to bottom (or other order) of their cache blocks. During this process, these raw search threads do not need to check the masked records because pre-select threads have already processed them.

If a user is a valid user and the user has proper biometric data, then raw search threads would identify the user without fail in one or more blocks. Once a user is identified by any of these threads, the user index and hit information (score and finger index) are sent to the SSS and the SSS asks all other SEs to terminate their respective search processes. If the user is not a valid user or is not identified for some reason, the processed queue is cleaned and a response is sent to the SSS indicating no match.

Figure 9:
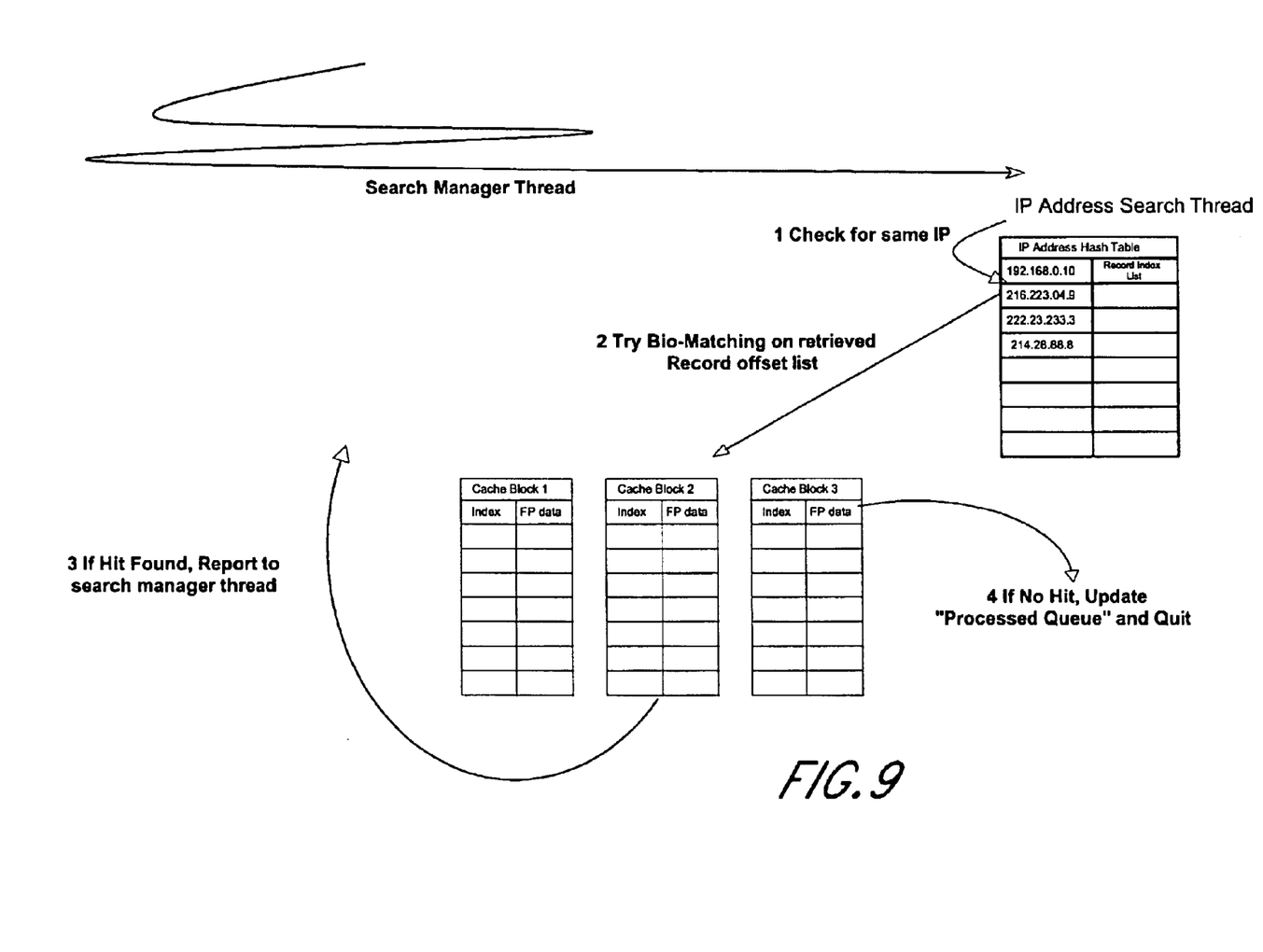
FIG. 9 illustrates a pre-select threads search execution.

A simple IP-address pre-select threads search execution (which is similar to other pre-select thread executions) is shown in FIG. 9.

As shown in FIG. 9, pre-select threads act upon their respective pre-select information and attempt to quickly identify the user. When a new user tries to access the system the first time, these threads may fail due to unavailability of this user's earlier pre-select information. However, instead of a raw search over all cache blocks, the raw search threads consider only the records that were not processed by any of the pre-select threads. Since the search size is reduced in each block and individual threads process each block in parallel, the user would be identified by any of these raw search threads if he/she were found to be a valid user.

Learning Capability

When a new user is identified by the system, a reference of the pre-select information of that user is stored in these hash tables. The pre-select information for the new user is added to the hash tables along with a reference to that user's record. A record reference is also added to other caches, such as at time-based cache. Similarly, whenever a user tries to modify/update his/her biometric information, the PC information of the user is added as a reference to the record index in the hash tables available in the SE where the user information is cached.

High Availability

Fault monitoring and recovery provides high availability. A fault-monitoring component in the SSS assures high availability of the system. If any of the SEs fail, the search sub system automatically executes a fault recovery mechanism wherein the cache blocks allocated the failed SE are distributed to the other available SEs. The SEs execute this recovery process in a separate thread so as not to affect the normal identification process execution. Further search executions can be made on these new blocks exactly the way the raw search threads are executed.

Using more than one SSS might improve fault tolerance.

Thus, it can be seen that the search systems and methods of this invention provide assured availability and higher performance compared to other biometric identification systems. By using the systems and methods of the invention, the customer has the freedom to choose the right algorithm and the right device to get the optimal performance.

Device Flexibility

Figure 10:
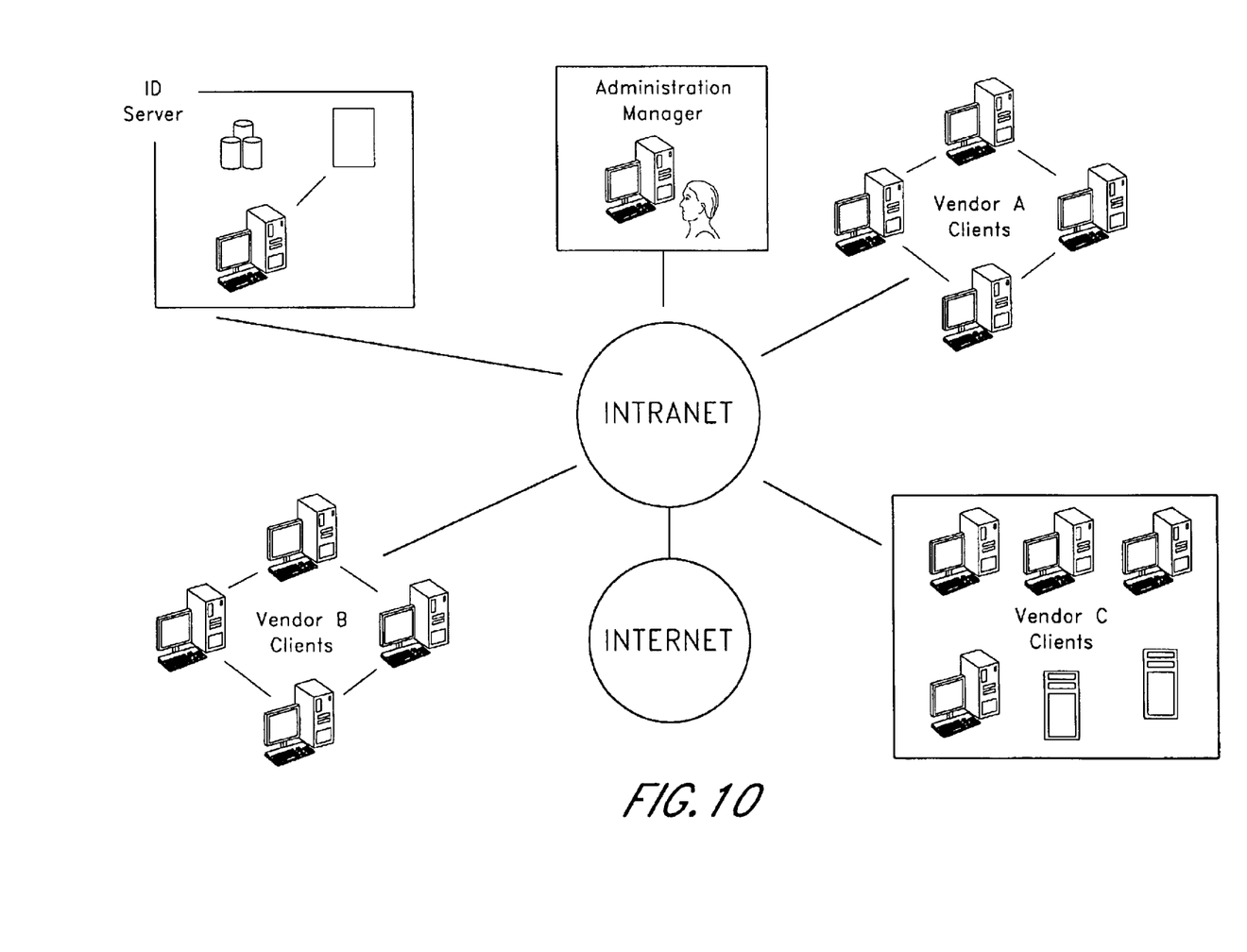
FIG. 10 illustrates a biometric authentication system according to embodiments of the present invention.
Figure 11:
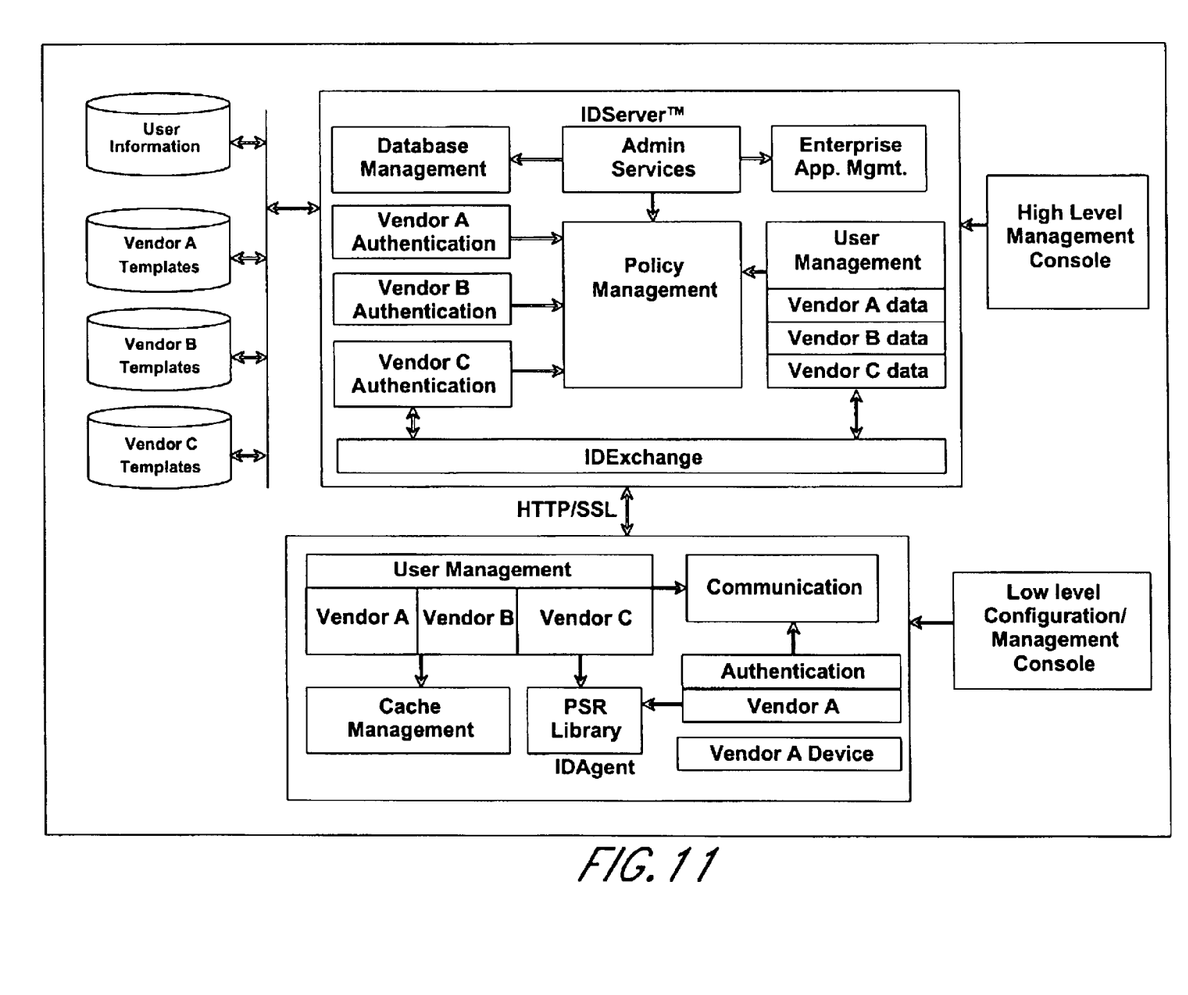
FIG. 11 shows more details of the system of FIG. 1.

FIGS. 10 and 11 illustrate a biometric authentication system organized as clients and servers. A person to be registered in the repository registers their biometric data using the server and registers using N input-specific processes, where each input-specific process might be for a particular device, device manufacturer's product line, device class or the like. The registered biometric data can be maintained in separate tables, one per input-specific process, as a single table, or some other combination. The number of input-specific processes supported could be dynamically configurable. For verification, only one input-specific process might be used. The choice of the input-specific process used can be set either by a configuration tool at the client end or by the server. This gives the system the capability to switch input-specific processes on the fly.

Registration

When a user registers himself or herself, the client captures personal identifiers of the registering person and extracts his or her biometric data (fingerprint, face, etc.) in each supported input-specific process. For example, the client might capture fingerprints in input-specific process A, B and C, face data in input-specific process X and Y, etc. Storage can be done also for various types of templates.

Authentication (Verification or Identification)

Whenever a person presents for authentication, the system uses a selected input-specific process for verification or identification. The selection of an input-specific process can be done by the client based on the biometric device being used at the point of presentation (i.e., location where the presented person provides the biometric data). The selection of an input-specific process can be done elsewhere and based on other considerations.

The presented person might be given the ability to dynamically configure the input-specific process for use with any of various devices (PCs, laptops, PDAs, cell phones, etc.) where a system client might be installed. The dynamic configuration might be sent as a parameter to the server to limit the biometric data that the presented person's inputs are compared against. Authentication can be done by comparing templates generated by the input-specific process.

The biometric authentication system can provide administrative facilities, such as a facility to allow administrator to dynamically configure supported input-specific processes in any of the client machines as needed. In some cases, there can be a set of machines supporting only three input-specific processes and a set of machines supporting more than three input-specific processes for registration or modification. This enables different vendors' devices and processes to work together.

The number of input-specific processes supported by the biometric authentication system can be dynamically configurable. The agent (client) can generate biometric templates for each supported input-specific process and send the templates to the server for registration. The server could store the templates in different tables along with a reference to the registering user's information.

The agent needs to use only one configured input-specific process for authentication. A "configured input-specific process type'" indicator can be sent to the server (along with existing parameters) for authentication by the agent or can be set by the server. Based on the chosen input-specific process, the server authenticates the presented person by invoking the respective input-specific process's authentication component. The "chosen input-specific process" is dynamically configurable. Dynamic addition of new input-specific processes to the system is possible.

Where a presented person indicates an input-specific process that was not used during registration, the system might use another compatible input-specific process, or present an error. For example, if the presented person indicates an input-specific process corresponding to "Vendor A client" but the presented person did not register using a Vendor A client device or compatible device, so that there is no "Vendor A biometric template" in records relating to the presented person, the server might return a message such as "User not registered with this input-specific process".

Although this invention has been disclosed in the context of certain preferred embodiments and examples, it will be understood by those skilled in the art that the present invention extends beyond the specifically disclosed embodiments to other alternative embodiments and/or uses of the invention and obvious modifications thereof. Thus, it is intended that the scope of the present invention herein disclosed should not be limited by the particular disclosed embodiments described above, but should be determined only by a fair reading of the claims that follow.

What is claimed is:

1. A method of authenticating the identity of a user based on biometric information of the user, comprising:

providing a user interface configured to repeatedly receive authentication requests from a plurality of requesting users, each authentication request containing biometric information of a requesting user;

learning a pattern of repeated receptions by the user interface of authentication requests from a first user;

based on the learned pattern, determining time periods of heightened probability of the user interface receiving an authentication request from the first user;

obtaining a biometric information file associated with the first user from a repository of users' biometric information files; and storing the biometric information file associated with the first user in a storage associated with the user interface during the determined time periods.

2. The method of claim 1, further comprising:

receiving an authentication request from the first user during said determined time periods;

receiving in the authentication request biometric information of the first user;

comparing the biometric information received in the authentication request with biometric information files temporarily stored in the storage to find the biometric information file associated with the first user; and based on the found biometric information file associated with the first user, learning an identity of the first user.

3. The method of claim 1, wherein learning the pattern comprises:

monitoring the user interface's repeated receptions of biometric information of the first user; and detecting the pattern from the repeated receptions.

4. The method of claim 1, wherein learning the pattern comprises receiving the pattern from the first user.

5. A system comprising:

a repository of multiple users' biometric information files, each file containing biometric information of a user;

a user interface configured to receive a user's biometric information;

a storage associated with the user interface;

a matching software module configured to compare a user's biometric information received by the user interface with the biometric information files in the repository to find a biometric information file that substantially matches the received biometric information; and one or more software modules configured to (1) learn a pattern associated with repeated reception's of a first user's biometric information by the user interface, (2) based on the learned pattern, determine time periods of heightened probability that the user interface will receive the first user's biometric information, (3) obtain a biometric information file associated with the first user from the repository, and (4) store the biometric information file associated with the first user in the storage during said determined time periods.

6. The system of claim 5, wherein the biometric information comprises fingerprints.

7. The system of claim 5, wherein the biometric information comprises facial scans.

8. The system of claim 5, wherein the biometric information comprises eye scans.

9. The system of claim 5, wherein the one or more software modules are configured to learn the pattern by monitoring the user interface's repeated receptions of biometric information of the first user and by detecting the pattern from said monitoring.

10. A system for authenticating the identity of a user based on biometric information of the user, comprising:

a repository of multiple users' biometric information files;

a user interface configured to receive a plurality of different types of biometric information of a user, each of said different types of biometric information being characterized as being obtained from a user by a different one of a plurality of different types of biometric capture devices; and a software module configured to execute in parallel a plurality of different algorithms for comparing biometric information received by the user interface to the biometric information files in the repository to find a biometric information file that substantially matches the received biometric information, each of the algorithms being associated with a different one of the capture devices.

11. A method of authenticating the identity of a user based on biometric information of the user, comprising:

receiving a user's biometric information; and executing in parallel a plurality of different algorithms for comparing the received biometric information to a plurality of biometric information files in a repository to find a biometric information file that substantially matches the received biometric information.

12. The method of claim 11, wherein receiving the user's biometric information comprises receiving one of a plurality of different types of biometric information, each of said different types of biometric information being characterized as being obtained by a different one of a plurality of different types of biometric capture devices, and wherein each of the algorithms is associated with a different one of the capture devices.

13. A biometric authentication system comprising:

a repository of biometric data of users processed according to a plurality of device-dependent processes;

means for determining an input-specific process; and means for comparing biometric data of a presented person using a determined input-specific process and a record in the repository having biometric data captured using the determined input-specific process.

* * * * *